United States Patent
Petrzik

(10) Patent No.: US 11,519,494 B2
(45) Date of Patent: Dec. 6, 2022

(54) ROTARY CONTROL DEVICE FOR A VEHICLE

(71) Applicant: ZF Friedrichshafen AG, Friedrichshafen (DE)

(72) Inventor: Lenard Petrzik, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 233 days.

(21) Appl. No.: 16/625,332

(22) PCT Filed: May 23, 2018

(86) PCT No.: PCT/EP2018/063539
§ 371 (c)(1),
(2) Date: Dec. 20, 2019

(87) PCT Pub. No.: WO2018/233970
PCT Pub. Date: Dec. 27, 2018

(65) Prior Publication Data
US 2021/0404549 A1 Dec. 30, 2021

(30) Foreign Application Priority Data
Jun. 21, 2017 (DE) .......................... 102017210438.4

(51) Int. Cl.
*F16H 59/08* (2006.01)
*B60K 37/06* (2006.01)
(Continued)

(52) U.S. Cl.
CPC .............. *F16H 59/08* (2013.01); *B60K 37/06* (2013.01); *F16D 57/002* (2013.01);
(Continued)

(58) Field of Classification Search
CPC ........... G05G 5/03; G05G 1/015; G05G 1/10; G05G 1/087; F16H 59/08; F16H 59/0217;
(Continued)

(56) References Cited

U.S. PATENT DOCUMENTS

| 5,022,509 A * | 6/1991 | Schweiger ............. B60K 37/06 477/81 |
| 2002/0057152 A1* | 5/2002 | Elferich ................... G05G 1/08 335/220 |

(Continued)

FOREIGN PATENT DOCUMENTS

| FR | 2 930 655 | 10/2009 |
| FR | 3 040 928 | 3/2017 |

OTHER PUBLICATIONS

International Search Report and Written Opinion of the International Search Authority dated Aug. 14, 2018 in International Application No. PCT/EP2018/063539 (English language) (10 pp.).

*Primary Examiner* — Daniel D Yabut
(74) *Attorney, Agent, or Firm* — Crowell & Moring LLP

(57) ABSTRACT

The invention relates to a rotary control device for a vehicle comprising a user interface surface, in particular a knob, that is embodied to rotate with respect to a housing of the device around a rotational axis of the device, further comprising a sensor unit for monitoring the orientation and/or rotational movement of the user interface surface with respect to the housing, a processing unit, and a communications interface for transmitting control signals according to an output from the processing unit, said output being generated by the processing unit on the basis of sensor data from the sensor unit.

12 Claims, 3 Drawing Sheets

(51) Int. Cl.
*F16D 57/00* (2006.01)
*F16H 59/02* (2006.01)
*G05G 1/015* (2008.04)
*G05G 1/10* (2006.01)
*G05G 5/03* (2008.04)

(52) U.S. Cl.
CPC ......... *F16H 59/0217* (2013.01); *G05G 1/015* (2013.01); *G05G 1/10* (2013.01); *G05G 5/03* (2013.01); *B60K 2370/126* (2019.05); *B60K 2370/158* (2019.05); *F16H 2059/081* (2013.01)

(58) Field of Classification Search
CPC ............. F16H 2059/081; F16D 57/002; B60K 2370/158; B60K 2370/126
See application file for complete search history.

(56) References Cited

U.S. PATENT DOCUMENTS

| | | | |
|---|---|---|---|
| 2011/0181405 A1* | 7/2011 | Periquet | G05G 5/03 340/407.2 |
| 2014/0150598 A1* | 6/2014 | Kern | G05G 5/03 74/510 |
| 2016/0216763 A1* | 7/2016 | Vanhelle | B60K 37/06 |
| 2016/0378131 A1 | 12/2016 | Battlogg | |
| 2017/0045958 A1* | 2/2017 | Battlogg | G06F 3/0487 |
| 2019/0179356 A1* | 6/2019 | Goto | F16F 9/535 |
| 2020/0043305 A1* | 2/2020 | Wakuda | G08B 6/00 |

\* cited by examiner

ROTARY CONTROL DEVICE FOR A VEHICLE

RELATED APPLICATIONS

This application is a filing under 35 U.S.C. § 371 of International Patent Application PCT/EP2018/063539, filed May 23, 2018, and claiming priority to German Patent Application 10 2017 210 438.4, filed Jun. 21, 2017. All applications listed in this paragraph are hereby incorporated by reference in their entireties.

BACKGROUND

Haptic interfaces for control are known for example from the European patent publication EP2065614A1, wherein an assembly for manipulating properties of a magnetic field is disclosed for the purpose of modulating the torque transfer between a rotational element and a housing of the haptic interface.

BRIEF DESCRIPTION OF THE DRAWINGS

Certain embodiments will next be explained in detail with reference to the following figures. They show.

BRIEF DESCRIPTION OF THE INVENTION

Figure 1:
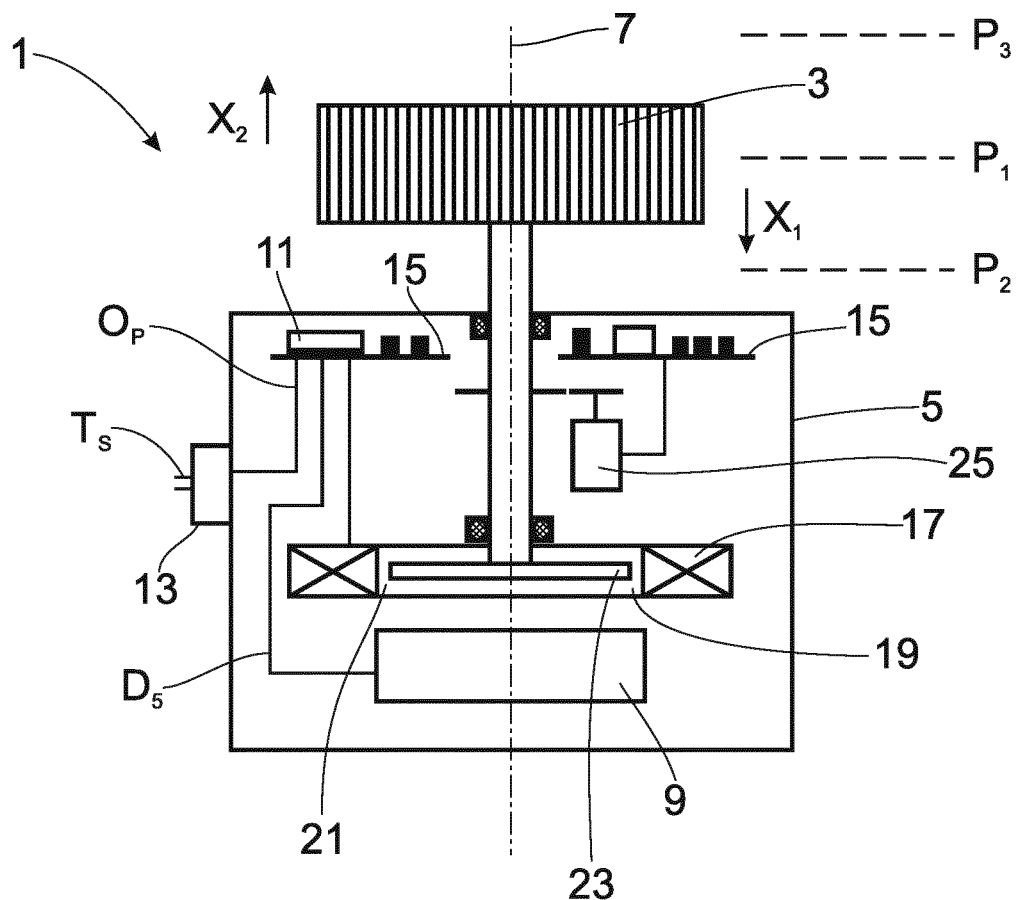
FIG. 1 shows a schematic diagram of an embodiment of the inventive rotary control device.

The invention relates to a rotary control device for a vehicle comprising a user interface surface, in particular a knob, that is embodied to rotate with respect to a housing of the device around a rotational axis of the device, further comprising a sensor unit for monitoring the orientation and/or rotational movement of the user interface surface with respect to the housing, a processing unit, and a communications interface for transmitting control signals according to an output from the processing unit, said output being generated by the processing unit on the basis of sensor data from the sensor unit.

DETAILED DESCRIPTION

An object of the invention is to introduce an improved rotary control device.

An object of the invention is achieved by a rotary control device defined by the subject matter of the independent claim. The dependent claims and the description define advantageous embodiments of the system.

The object is therefore achieved by rotary control device for a vehicle comprising a user interface surface that is embodied to rotate with respect to a housing of the device around a rotational axis of the device, further comprising a sensor unit for monitoring the orientation and/or rotational movement of the user interface surface with respect to the housing, a processing unit, and a communications interface for transmitting control signals according to an output from the processing unit, said output being generated by the processing unit on the basis of sensor data from the sensor unit, wherein the rotary control device further comprises a magnetorheological actuator, wherein the magnetorheological actuator comprises a rotational element that is mechanically connected to the user interface surface and serves to interact with a magnetorheological fluid of the magnetorheological actuator, and wherein the magnetorheological actuator comprises an assembly for generating and/or manipulating properties of a magnetic field acting on the magnetorheological fluid such that the magnetorheological actuator serves to modulate torque transmission between the user interface surface and the housing, wherein the assembly is embodied to generate and/or manipulate the properties of the magnetic field according to initialization governing signals output from the processing unit when the user interface surface is in an orientation for selecting a park operation mode and when a status signal received by the device indicates that a drive unit of the vehicle is in an inactive state.

A position of the user interface surface in the sense of the invention refers to the placement of the user interface surface within a plane spatially displaced from the housing of the device by a specified distance. An orientation of the user interface surface in the sense of the invention refers to a rotational displacement of the user interface surface around the rotational axis of the device by a specific degree of rotation with respect to an initial setting of the user interface surface with reference to the housing.

The magnetorheological fluid defines the behavior of the rotary control device. To this end, a voltage supplied to the assembly is varied to induce a surrounding magnetic field that changes the viscosity of the fluid. Depending on the magnetic field, in particular depending on properties of the magnetic field such as intensity and/or direction, the MRF can vary between liquid and solid state, which can be controlled very accurately. In a fluid state, MRF transfers little to no torque between the rotational element and the housing. However, as the viscosity increases and the fluid approaches a solid state, the sheer forces within the fluid and between the fluid and the rotational element as well as between the fluid and the housing, or a component attached fixedly to the housing, increases. This leads to an increasing torque transfer between the user interface surface and the housing.

The device can be used to select an operation mode of the vehicle, which is for example a forwards drive operation mode wherein torque is transferred from a drive unit of the vehicle in order to propel the vehicle in a forwards direction, a reverse drive operation mode wherein torque is transferred from a drive unit of the vehicle in order to propel the vehicle in a reverse direction, a neutral operation mode wherein no torque is transferred from a drive unit of the vehicle, a park operation mode where a torque transmission unit attached to the drive unit of the vehicle is mechanically blocked, or another operation mode.

When a position and/or orientation of the user interface surface remains constant in the absence of a force applied the device from an external source, then this position and/or orientation of the user interface surface can be referred to as a stable position. On the other hand, when the user interface surface does not remain in a certain position or orientation, because for example a mechanism of the device applies a force internally, then this position and/or orientation can be referred to as being nonstable.

A safety relevant function of the vehicle in the sense of the invention can be for example the selection of an operation mode of the vehicle, steering, accelerating or braking the vehicle. A nonsafety function of the vehicle can be for example navigation or control of a multimedia interface.

A communications pathway in the sense of the invention can be for example a hardline for transferring data such as a data-bus and/or a wireless data transmission channel. In many modern street vehicles, a CAN-databus is a preferred type of communications pathway.

The user interface surface, or knob, in the sense of the invention can comprise the outer surface of a ring shaped and/or half shell shaped structure, which is accessible to an operator, i.e. user, of the vehicle. The user interface surface can further comprise a construction underlying the outer surface of the user interface surface.

In an embodiment of the rotary control device the device is embodied to transmit control signals for activating the drive unit in the case where the user interface surface is rotated a predetermined amount around the rotational axis to reach an ignition orientation while the initialization governing signals are being output to modulate the torque transfer.

In an embodiment of the rotary control device the processing unit is embodied to output the initialization governing signals that serve to cause the assembly to manipulate the properties of the magnetic field such that a braking force progression is formed along the rotational pathway from an initial orientation of the user interface surface to an ignition orientation, and the braking force progression from the initial orientation to the ignition orientation varies from the braking force progression formed along a rotational pathway of the user interface surface between the initial orientation and an orientation for selecting an operation mode of the vehicle.

In an embodiment of the rotary control device the initial orientation corresponds to an orientation for selecting a park operation mode of the vehicle, and the ignition orientation can only be reached by a rotational movement of the user interface surface in a rotational direction opposite to a rotational direction in which the user interface surface must be rotated to a reach an orientation for selecting a further operation mode of the vehicle.

In an embodiment of the rotary control device the processing unit is embodied to output governing signals such that the braking force progression formed along the rotational pathway from the initial orientation of the user interface surface to the ignition orientation corresponds to a braking force progression defined by a mechanical system requiring a rotational movement for igniting an engine in a motor vehicle.

In an embodiment of the rotary control device the processing unit is embodied to output governing signals such that the braking force progression formed along the rotational pathway from the initial orientation of the user interface surface to the ignition orientation comprises a first partial pathway wherein braking force continually increases, a second partial pathway wherein the braking force continually decreases and a third partial pathway wherein the braking force continually increases to a value greater than the value of the braking force reached within the first partial pathway.

In an embodiment of the rotary control device the device comprises a torque sensor, and the device is embodied to only transmit the control signals for activating the drive unit of the vehicle when an operator applies a predetermined amount of torque to the user interface surface while in the ignition orientation.

In an embodiment of the rotary control device when the user interface surface is in the ignition orientation and a predetermined amount of torque is applied to the user interface surface, that the processing unit is embodied to output governing signals such that an ignition braking force progression is formed along an ignition rotational pathway extending beyond the rotational pathway from the initial orientation of the user interface surface to the ignition orientation in the same rotational direction, and the processing unit is embodied to output governing signals for governing the assembly such that the assembly manipulates the magnetic field acting on the fluid to fluctuate, thereby simulating a vibrational haptic feedback along the ignition rotational pathway to the user applying torque to the user interface surface at the moment of fluctuation.

In an embodiment of the rotary control device the device comprises an additional MRF-Actuator for modulating force transmission between the user interface surface and the housing when the user interface surface is displaced from a first position to a second position, and the initialization governing signals output from the processing unit modulate the force transmission such that a braking force progression formed along the displacement pathway corresponds to a braking force progression pathway defined by a mechanical system in which a key is inserted into a keyhole.

In an embodiment of the rotary control device a control signal for activating a drive unit of the vehicle is only transmitted from the communications interface when the user interface surface is first displaced from a first position to a second position and subsequently rotated from an initial orientation to an ignition orientation.

In an embodiment of the rotary control device the rotational element comprises a chamber containing the magnetorheological fluid, and a static element is provided, which is fixedly arranged with respect to the housing and arranged at least partially within the chamber, such that the torque transmission between inner surface of the chamber of the rotational element and the static element is dependent on the properties of a magnetic field.

In an embodiment of the rotary control device the rotational element is embodied to rotate within a chamber of the actuator containing the magnetorheological fluid, said chamber being fixedly arranged with respect to the housing, such that the torque transmission between the rotational element and an inner surface of the chamber is dependent on the properties of a magnetic field.

FIG. 1 shows a schematic diagram of an embodiment of the inventive rotary control device 1 having a user interface surface 3, which can be moved and rotated by a user or operator of a vehicle. The user interface surface can be rotated around a rotational axis 7 of the device 1 to various orientations, for example for selecting operation modes of a vehicle. The user interface surface 3 can furthermore be moved by a user or operator of the vehicle between a first, second and third position P1, P2, P3.

The device 1 comprises a housing 5, which at least partially encloses a processing unit 11 mounted on a substrate 15, which is a printed circuit board. The processing unit 11 is connected to a communications interface 13. Via the communications interface 13 signals such as control signals Ts can be transmitted and received. The processing unit 11 is further connected to a sensor unit 9 which serves to monitor the rotational movement and/or orientation of the user interface surface with respect to the housing 5. The sensor unit 9 transmits sensor data Ds to the processing unit 11 and on the basis of this sensor data Ds, the processing unit 11 can generate control signals to transmit via the communications interface 13.

The device further comprises an assembly 17 for generating and manipulating a magnetic field in a chamber 19 of the housing 5. The chamber contains a magnetorheological fluid 21 also known as MRF. Positioned partially within the chamber is a rotational element 23. The rotational element 23 is mechanically connected to the user interface surface 3 and rotates with the rotation of the interface 3.

Corresponding to changes in properties of the magnetic field caused by the assembly 17, such as field strength and direction, the magnetorheological fluid 12 varies in viscosity so to speak. Therefore, in a corresponding way, the fluid transfers more or less torque between the user interface surface 3 and the housing 5 of the device 1. This is due to the changing sheer forces within the fluid and between the fluid and the chamber wall. Since the housing 5 of the device is generally fixedly mounted within the vehicle, the assembly can be considered to modulate a sort of braking force acting on the user interface surface 3. Such systems comprising MRF 21 in a chamber 19, rotational elements 23, and assemblies 17 for manipulating the magnetic field within the chamber 19 are often referred to as MRF-Actuators. The processing unit 11 is embodied to output governing signals for controlling the assembly 17. The assembly 17 can, for example, be driven by a circuit on the substrate 15 feeding the assembly 17 with a pulsed width modulated (PWM) current or voltage in accordance with the governing signals from the processing unit 11.

The device further comprises a servo actuator 25 which engages with the rotational element 23 and can therefore apply torque to the user interface surface 3.

Figure 2:
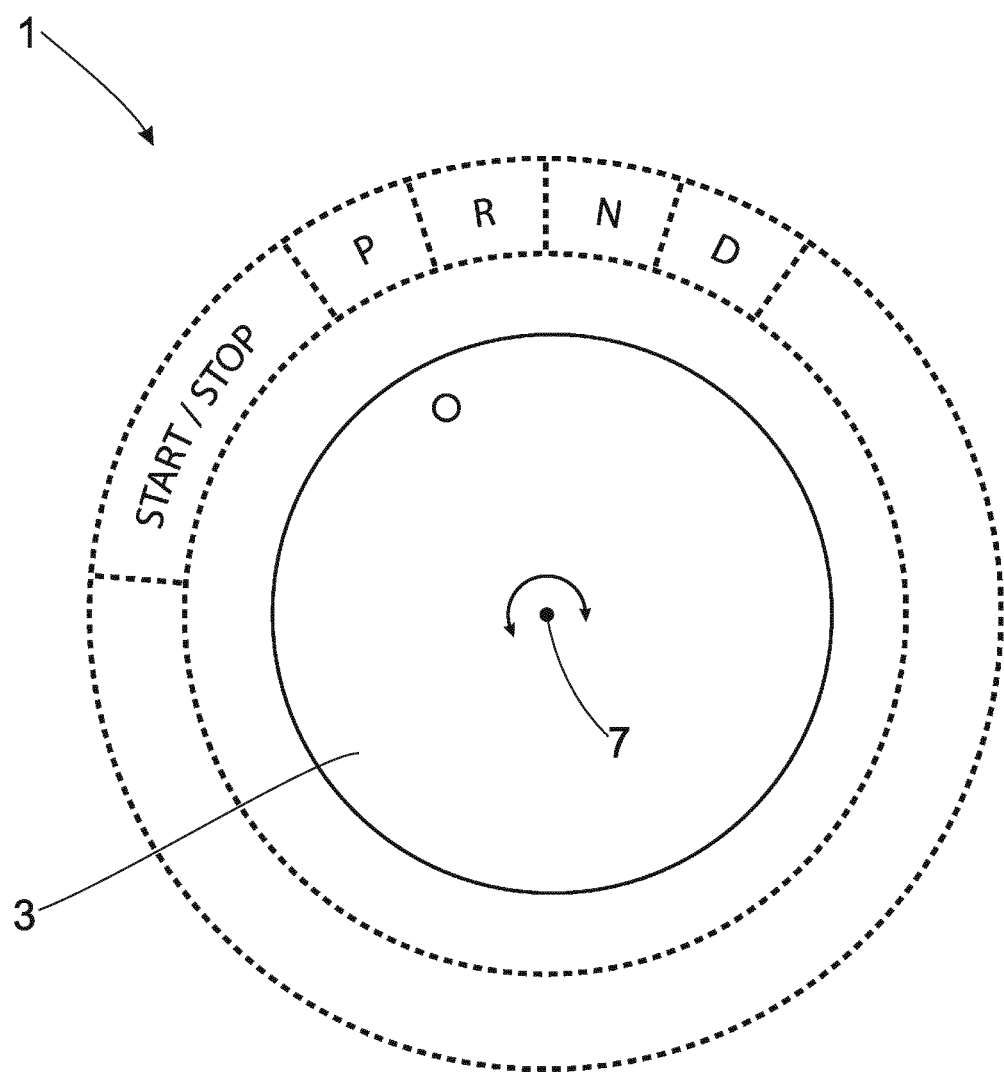
FIG. 2 shows a schematic diagram of an operation mode selection sequence of an embodiment of the inventive rotary control device.

FIG. 2 shows a schematic diagram of an operation mode selection sequence of an embodiment of the inventive rotary control device 1. The user interface surface 3 is in an orientation in which a park operation mode P of the vehicle is selected. When an operator or user of the vehicle rotates the knob counterclockwise in the direction of the ignition (start/Stop) orientation, the MRF actuator implements the ignition governing signals from the processing unit 11 in order to provide haptic feedback to the operator. Since the haptic feedback is defined based on a convention mechanical key turning haptic, the cognitive burden for the operator is reduced.

Figure 3:
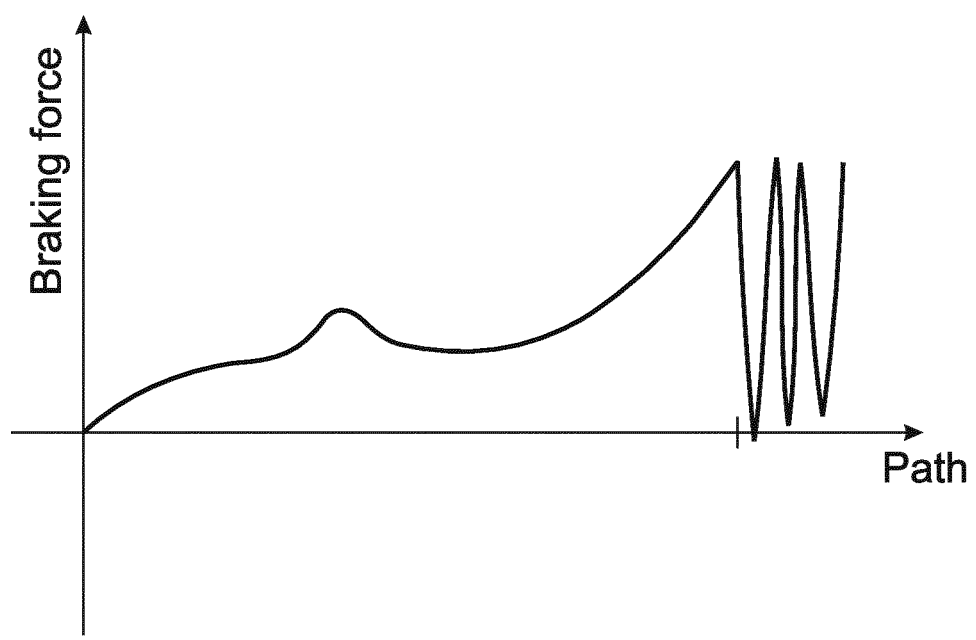
FIG. 3 shows an exemplary braking force progression diagram of an embodiment of the inventive rotary control device.

FIG. 3 shows an exemplary braking force progression diagram of an embodiment of the inventive rotary control device with respect to the ignition rotational pathway. The braking force is increased and then drops off, emulating a half turn of a key in a conventional street vehicle. The braking force is then increased as the user interface surface approaches the ignition orientation. When the operator applies a predetermined level of torque to the user interface surface, the device transmits a control signal to the drive unit of the vehicle to activate the drive unit, which can for example be an electric motor. At the same time, the MRF actuator can manipulate the magnetic field such that the braking force is removed at intervals and again increased to a predetermined value at intervals. This manipulation of the magnetic field causes the user interface surface to move incrementally at intervals, which can be interpreted by the operator as a vibration.

REFERENCE CHARACTERS

1 Rotary control device
3 user interface surface
5 housing
7 rotational axis
9 sensor unit
11 processing unit
13 communications interface
15 substrate/PCB
17 assembly for generating/manipulating magnetic field
19 chamber
21 magnetorheological fluid
23 rotational element
25 servo actuator
X1 first direction
X2 second direction
P1 first position
P2 second position
P3 third position

The invention claimed is:

1. A rotary control device for a vehicle, the device comprising:
    a user interface surface that is configured to rotate with respect to a housing of the device around a rotational axis of the device;
    a sensor unit for monitoring at least one of the orientation and a rotational movement of the user interface surface with respect to the housing, a processing unit; and
    a communications interface for transmitting control signals according to an output from the processing unit, said output being generated by the processing unit on the basis of sensor data from the sensor unit,
    wherein the rotary control device further comprises a magnetorheological actuator, wherein the magnetorheological actuator comprises a rotational element that is mechanically connected to the user interface surface and serves to interact with a magnetorheological fluid of the magnetorheological actuator,
    wherein the magnetorheological actuator comprises an assembly for generating and/or manipulating properties of a magnetic field acting on the magnetorheological fluid such that the magnetorheological actuator serves to modulate torque transmission between the user interface surface and the housing,
    wherein the assembly is configured to generate and/or manipulate the properties of the magnetic field according to initialization governing signals output from the processing unit when the user interface surface is in an orientation for selecting a park operation mode and when a status signal received by the device indicates that a drive unit of the vehicle is in an inactive state, and
    wherein when the user interface surface is in the ignition orientation and a predetermined amount of torque is applied to the user interface surface, that the processing unit is configured to output governing signals such that an ignition braking force progression is formed along an ignition rotational pathway extending beyond the rotational pathway from the initial orientation of the user interface surface to the ignition orientation in the same rotational direction, and in that the processing unit is configured to output governing signals for governing the assembly such that the assembly manipulates the magnetic field acting on the fluid to fluctuate, thereby simulating a vibrational haptic feedback along the ignition rotational pathway to the user applying torque to the user interface surface at a moment of fluctuation.

2. The rotary control device Rotary control device according to claim 1, wherein the device is configured to transmit control signals for activating the drive unit when the user interface surface is rotated a predetermined amount around the rotational axis to reach an ignition orientation while the initialization governing signals are being output to modulate the torque transfer.

3. The rotary control device according to claim 1, wherein the processing unit is configured to output the initialization governing signals that serve to cause the assembly to manipulate the properties of the magnetic field such that a braking force progression is formed along a rotational pathway from an initial orientation of the user interface surface to an ignition orientation, and in that the braking force progression from the initial orientation to the ignition orientation varies from the braking force progression formed along a rotational pathway of the user interface surface between the initial orientation and an orientation for selecting an operation mode of the vehicle.

4. The rotary control device according to claim 1, wherein the initial orientation corresponds to an orientation for selecting a park operation mode of the vehicle, and in that an ignition orientation can only be reached by a rotational movement of the user interface surface in a rotational direction opposite to a rotational direction in which the user interface surface must be rotated to a reach an orientation for selecting a further operation mode of the vehicle.

5. The rotary control device according to claim 1, wherein the processing unit is configured to output governing signals such that a braking force progression formed along the rotational pathway from the initial orientation of the user interface surface to the ignition orientation corresponds to a braking force progression defined by a mechanical system requiring a rotational movement for igniting an engine in a motor vehicle.

6. The rotary control device according to claim 1, wherein the processing unit is configured to output governing signals such that the braking force progression formed along the rotational pathway from the initial orientation of the user interface surface to the ignition orientation comprises a first partial pathway wherein braking force continually increases, a second partial pathway wherein a braking force continually decreases and a third partial pathway wherein the braking force continually increases to a value greater than the value of the braking force reached within the first partial pathway.

7. The rotary control device according to claim 1, wherein the device comprises a torque sensor, and in that the device is configured to only transmit the control signals for activating the drive unit of the vehicle when an operator applies a predetermined amount of torque to the user interface surface while in the ignition orientation.

8. The rotary control device according to claim 1, wherein the device comprises an additional MRF-Actuator for modulating force transmission between the user interface surface and the housing when the user interface surface is displaced from a first position to a second position, and in that the initialization governing signals output from the processing unit modulate the force transmission such that a braking force progression formed along a displacement pathway corresponds to a braking force progression pathway defined by a mechanical system in which a key is inserted into a keyhole.

9. The rotary control device according to claim 1, wherein a control signal for activating a drive unit of the vehicle is only transmitted from the communications interface when the user interface surface is first displaced from a first position to a second position and subsequently rotated from an initial orientation to an ignition orientation.

10. The rotary control device according to claim 1, wherein the rotational element comprises a chamber containing the magnetorheological fluid, and in that a static element is provided, which is fixedly arranged with respect to the housing and arranged at least partially within the chamber, such that the torque transmission between inner surface of the chamber of the rotational element and the static element is dependent on the properties of a magnetic field.

11. The rotary control device according to claim 1, wherein the rotational element is configured to rotate within a chamber of the actuator containing the magnetorheological fluid, said chamber being fixedly arranged with respect to the housing, such that the torque transmission between the rotational element and an inner surface of the chamber is dependent on the properties of a magnetic field.

12. A rotary control device for a vehicle, the device comprising:
a user interface surface that is configured to rotate with respect to a housing of the device around a rotational axis of the device;
a sensor unit for monitoring at least one of the orientation and a rotational movement of the user interface surface with respect to the housing, a processing unit; and
a communications interface for transmitting control signals according to an output from the processing unit, said output being generated by the processing unit on the basis of sensor data from the sensor unit,
wherein the rotary control device further comprises a magnetorheological actuator, wherein the magnetorheological actuator comprises a rotational element that is mechanically connected to the user interface surface and serves to interact with a magnetorheological fluid of the magnetorheological actuator,
wherein the magnetorheological actuator comprises an assembly for generating and/or manipulating properties of a magnetic field acting on the magnetorheological fluid such that the magnetorheological actuator serves to modulate torque transmission between the user interface surface and the housing,
wherein the assembly is configured to generate and/or manipulate the properties of the magnetic field according to initialization governing signals output from the processing unit when the user interface surface is in an orientation for selecting a park operation mode and when a status signal received by the device indicates that a drive unit of the vehicle is in an inactive state, and
wherein the device comprises an additional MRF-Actuator for modulating force transmission between the user interface surface and the housing when the user interface surface is displaced from a first position to a second position, and in that the initialization governing signals output from the processing unit modulate the force transmission such that a braking force progression formed along a displacement pathway corresponds to a braking force progression pathway defined by a mechanical system in which a key is inserted into a keyhole.

* * * * *